(12) United States Patent
Kurokawa

(10) Patent No.: US 7,625,049 B2
(45) Date of Patent: Dec. 1, 2009

(54) RUBBER CRAWLER

(75) Inventor: Noriaki Kurokawa, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/516,069

(22) PCT Filed: May 21, 2003

(86) PCT No.: PCT/JP03/06309

§ 371 (c)(1),
(2), (4) Date: Nov. 29, 2004

(87) PCT Pub. No.: WO03/099529

PCT Pub. Date: Dec. 4, 2003

(65) Prior Publication Data

US 2005/0218722 A1    Oct. 6, 2005

(30) Foreign Application Priority Data

| May 29, 2002 | (JP) | ............................. 2002-155586 |
| May 31, 2002 | (JP) | ............................. 2002-158479 |
| May 31, 2002 | (JP) | ............................. 2002-158480 |
| May 31, 2002 | (JP) | ............................. 2002-159004 |
| May 31, 2002 | (JP) | ............................. 2002-159336 |
| Dec. 12, 2002 | (JP) | ............................. 2002-361253 |

(51) Int. Cl.
*B62D 55/253* (2006.01)

(52) U.S. Cl. ...................... 305/167; 305/179

(58) Field of Classification Search ................. 305/167, 305/169, 177, 165, 178–179, 171
See application file for complete search history.

(56) References Cited

U.S. PATENT DOCUMENTS

| 3,347,601 A | 10/1967 | Bombardier |
| 3,612,626 A | 10/1971 | Fuchs |
| 5,540,489 A | 7/1996 | Muramatsu et al. |
| 6,588,862 B1 * | 7/2003 | Pringiers ..................... 305/167 |

FOREIGN PATENT DOCUMENTS

| EP | 1 198 382 A | 4/2002 |
| FR | 1 117 612 A | 5/1956 |
| JP | 06 316281 A | 11/1994 |
| JP | 2000-313371 A | 11/2000 |
| JP | 2002-37154 A | 2/2002 |

* cited by examiner

*Primary Examiner*—Jason R Bellinger
(74) *Attorney, Agent, or Firm*—Sughrue Mion, PLLC

(57) ABSTRACT

The present invention provides a rubber crawler used for a running unit of a vehicle for farm work, or civil engineering/construction work. Core bars are embedded with a constant spacing in a lengthwise direction of the rubber crawler without steel cords. A closed-loop opening is formed in each of left and right wing portions, which are of a rubber embedding portion of a core bar. The edge portions of the closed-loop openings of the adjacent core bars are fitted into fitting portions with a coupling body including the fitting portions in which both ends are opened in an inward direction. The edge portions are connected with each other at the coupling body to make the coupling body as a counter-tensile material.

11 Claims, 11 Drawing Sheets

RUBBER CRAWLER

BACKGROUND OF THE INVENTION

1. Field of the Invention

The present invention relates to a rubber crawler mainly used for a running unit of construction or civil engineering machinery (hereinafter merely referred to as vehicle). More particularly, the invention relates to a rubber crawler which adopts a novel structure as a tensile reinforcement.

2. Description of the Related Art

In the structure of the rubber crawler used in the conventional vehicles, as shown in FIG. 1, a core bar a which forms a running path of a rotating wheel is embedded in a rubber b with a constant spacing in a lengthwise direction of the rubber crawler, and steel cords d in a row are also embedded in the rubber in order to surround outsides of left and right wing portions c of the core bar a to resist tensile force applied to the rubber crawler. A top surface of a projection ao formed in the core bar a becomes a running surface of the rotating wheel. Because relatively thin cord wires are twisted in the steel cord d, rust is generated due to moisture invading the rubber from the outside, and finally breakage of steel cord d is not prevented from occurrence.

Japanese Patent Laid-Open Publication No. 2000-313371 is an example in which the steel cord is not used. As shown in FIG. 2, in the rubber crawler of Japanese Patent Laid-Open Publication No. 2000-313371, rods f which corresponds to the left and right wing portions are used. Pairs of the rods f and f are inserted through blocks g and g from left and right ends of the rods f and f. Coupling links h and h are fitted into the rods g and g. A row of the blocks g is arranged to be shifted regarding the other row of the blocks g. The top surfaces of the blocks g as a whole become the running surface of the rotating wheel. The coupling links h and h are employed instead of a conventional steel cord.

In the rubber crawler of Japanese Patent Laid-Open Publication No. 2000-313371, the rod f, the block g, and the coupling link h must be regularly combined. This demands careful assembly and the production efficiency is questioned. The block g and the coupling link h are need to be assembled from the left and light sides of the rod f. This means a great width of a work space. In addition, when the rod f, the block g, and the coupling link h are arranged at predetermined positions of a mold of the rubber crawler after the assembly, the block g or the coupling link h might disengage from the rod f. No space exists where the rod f is fitted into the block g or the coupling link h in the mold. These features show that the production efficiency is not good. Generally, dealing with the rod f by hand is not recommended. In this point, in the technology of Japanese Patent Laid-Open Publication No. 2000-313371, manual handling of the rod f is indispensable for fitting the rod f into the block g or the coupling link h from a widthwise direction of the rod f. Such handling affects the adhesion of the rods f to the rubber.

SUMMARY OF THE INVENTION

The present invention differs from the conventional technology in the technical idea. The invention provides a novel structure of the rubber crawler in which the steel cords are not used.

Further, the invention is mainly made in order to prevent the phenomenon of the steel cord breakage. The invention provides the rubber crawler in which the steel cords formed by twisting thin wires are not used.

A rubber crawler of the invention has core bars which are embedded with constant spacing in a lengthwise direction of the rubber crawler. The rubber crawler further has following features. A pair of edge portions is formed in each of left and right wing portions which are of a rubber embedding portion of a core bar. The edge portions of the adjacent core bars are coupled with each other by fitting the edge portions into another fitting portions with a coupling body including the fitting portions in which both ends are opened in an inward direction. In this way, the coupling body can be a counter-tension portion.

With reference to a shape of the wing portion of the core bar, the pair of edge portions is made by forming a closed-loop opening in the left and right wing portions. Alternatively, the pair of edge portions is made by forming a tuning fork shape in the left and right wing portions. A cross section of the edge portion may have a substantially circular shape.

With reference to the coupling body, the coupling body includes the fitting portions in which both ends are opened in the inward direction, and appears to have a C-shape or an S-shape when viewed from a lateral face. The coupling body is made of metal or plastic.

With reference to a relationship between the coupling body and the edge portion, a condition that $L \geqq 1.5 R$ and $A/D \geqq 0.7$ may be used when a radius of the cross section of the edge portion of the core bar is set to R, a width of the edge portion is set to D, a length from the deepest portion of the fitting portion of the coupling portion to an end of the fitting portion is set to L, and a width of the coupling body is set to A. Another condition that $A/B \geqq 0.3$ and $A/C \geqq 0.1$ may be used when a lateral width of the wing portion of the core bar is set to B and a lateral width of the core bar is set to C.

With reference to the relationship between the pair of edge portions and the rubber crawler, a condition that $0.7 \geqq L_0/P \geqq 0.4$ may be used when a center interval of the pair of edge portions is set to $L_0$ and a spacing of the rubber crawler is set to P.

With reference to the relationship between the coupling body embedded in the rubber crawler and the lug, from the viewpoint of durability of the rubber crawler, the rubber lugs are preferably formed in an outer surface of the rubber crawler located at a position where the coupling body is covered.

As a structure of the rubber crawler in which the coupling body is embedded, a recess A may be formed opposite an edge side in a longitudinal direction of the rubber crawler of the coupling body, on an inner radius side and/or an outer radius side of the rubber crawler. The recess A may be through an inner surface to the outer surface of the rubber crawler. The recess A may be formed along the edge portion in a width direction with respect to the rubber crawler of the coupling body.

In consideration of winding resistance or the like, a recess B may be formed on an inside and/or an outside in a rubber elastic body out of the coupling body embedded in the width direction of the rubber crawler. The recess B may be formed on the inner radius side and/or the outer radius side of the rubber elastic body. The recesses B may be formed in line in the width direction of the rubber elastic body.

DETAILED DESCRIPTION OF THE INVENTION

Figure 1:
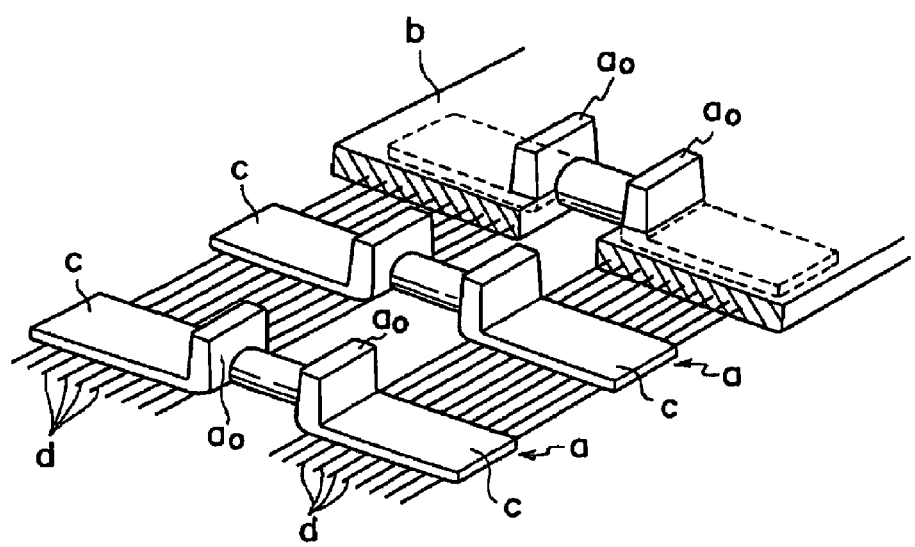
FIG. 1 is an oblique perspective figure showing a structure of a rubber crawler used for the conventional vehicle.
Figure 2:
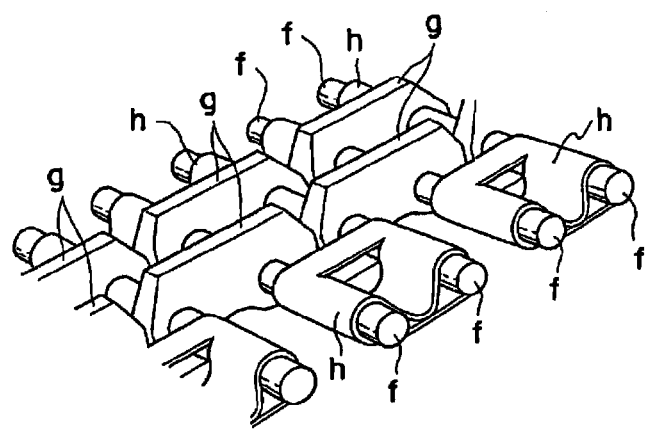
FIG. 2 is an oblique perspective figure of a core bar showing the structure of the rubber crawler disclosed in Japanese Patent Laid-Open Publication No. 2000-313371.

A rubber crawler of the present invention has core bars. The core bar has left and right wing portions where rubber is embedded. The left and right wing portions each have an edge portion which is a part of a closed-loop opening. A coupling body with fitting portions is employed. Each of the fitting portion opens at both ends in an inward direction. The edge portions are coupled with the fitting portions to form the coupling body and the core bars are connected with coupling bodies.

Because the edge portions in the left and right wing portions of the core bar are coupled with the coupling body, which includes the edge portions, the edge portions will not disengage from the coupling body even if the tensile force is applied. Further, the core bars of the invention can sequentially be set in the mold, which produces the rubber crawler to couple the edge portions of the core bars with the coupling body. Therefore, unlike the conventional example described above, the coupling body is not required to fit from a lateral direction, and its assemble process becomes simple.

In the case where the edge portions are the openings formed in the left and right wing portions which are of the rubber embedding portion, because surroundings of the opening is in a closed state, the coupling body will not disengage off from the lateral side.

A C-shaped coupling body has the shape appeared when viewed from a lateral face. The C-shaped coupling body has the structure in which the fitting portions opened in the inward direction are provided at the both ends of the coupling body in the same sides with respect to the central portion of the coupling body. An S-shaped coupling body has the structure in which the fitting portions opened in the inward direction are provided at the both ends of the coupling body in the opposite sides with respect to the central portion of the coupling body. Both the C-shaped coupling body and the S-shaped coupling body couple the edge portions by fitting the edge portions into the fitting portions of the coupling bodies.

In the invention, optimization of a relationship between the core bar and the coupling body may be sought. Particularly, a structure which prevents problems generated by external forces, when the rubber crawler is bent by a sprocket or an idler, or when reverse bending phenomenon occurs in the case where the rubber crawler runs up on a protrusion of a running surface, may be sought.

Therefore, assuming that the cross-sectional radius of the edge portion in the wing portion is set to R and the length from the deepest part of the fitting portion to an end of the fitting portion of the coupling body is set to L, the edge portion will not disengage from the fitting portion of the coupling body when L is not lower than 1.5R. If L is excessively longer, the fitting work will become difficult. In this sense, naturally, a limit of the length L exists.

When the lateral width of the edge portion of the core bar is set to D and the width of the coupling body is set to A, A/D is not lower than 0.7. D is not lower than A. When A/D is smaller than 0.7, the coupling body might move in a lateral direction while the edge portion is fitted into the coupling body, and the rigidity of the rubber crawler decreases. Namely, when A/D is not lower than 0.7, the side shift of the coupling body in the widthwise direction is suppressed, the rigidity (twisting resistance) of the rubber crawler is ensured, running-off resistance and abrasive resistance (resistance to one-side abrasion) are improved.

When the lateral width of the wing portion, which forms the edge portion is formed is set to B, in order to enhance the transverse rigidity of the rubber crawler, it is preferable that A/B is not lower than 0.3. When the lateral width of the core bar is set to C, in order to enhance the transverse rigidity of the rubber crawler, it is preferable that A/C is not lower than 0.1.

When the center interval between the pair of edge portions fitted into the fitting portions of the coupling body is set to $L_0$ and the spacing of the rubber crawler is set to P in order to smoothly rotate the rubber crawler, $L_0/P$ may not be greater than 0.7 and $L_0/P$ may not be lower than 0.4.

In the C-shaped coupling body, the edge portions are fitted into the fitting portions, while the fitting portions face the outer radius side of the rubber crawler, or while the fitting portions face the inner radius side of the rubber crawler. The inside of the rubber crawler is compressed about the coupling body and the outside is subjected to tensile force. In the case where the fitting portions face the outer radius side of the rubber crawler, since the end portions of the fitting portions face the outside, strain is concentrated on the end portions of the fitting portions when the outside is subjected to the tensile force. Therefore, sometimes a crack is generated from a starting point of the end portions outside the rubber, and the crack develops to decrease a life of the rubber crawler. The same phenomenon is generated in the fitting portions of the S-shaped coupling body.

The rubber lug is formed on the outer radius side of the rubber crawler. The rubber lug is formed at the position where the coupling body is covered with the rubber lug, or between the coupling bodies at the position where the wing portion of the core bar is covered with the rubber lug. In order to eliminate the crack of the rubber, the rubber lug may be formed at the position where the coupling body is covered with the rubber lug. In the rubber crawler in which the fitting portions of the coupling body are arranged so as to face the outside, the rubber lug at the position where the coupling body is covered with the rubber lug may be formed. In this case, the thickness of the rubber region outside the rubber crawler is increased with respect to the end portions of the fitting portions of the coupling body, which allows the rubber crack to be prevented.

When the rubber crawler of the invention is wound about the sprocket or the like, the fitting portion of the coupling body is rotated about the edge portion. Because the rotation is repeated, the rubber near the fitting portion is always subjected to the strain due to the shear distortion, and the crack caused mainly by degradation of the rubber is likely to occur. The rotational resistance of the rubber crawler is increased due to shear resistance of the rubber, which causes energy loss.

In consideration of the adverse effects caused by the shear resistance on the rubber, the rubber may be removed in the region where the crack tends to occur. Along with this, in order to decrease the adverse affection such as the generation of the rubber crack by the shear resistance and magnitude of the rotational resistance based on the shear resistance, the recess A may be provided at a predetermined position in the rubber crawler.

Even if the above-described countermeasure is adopted, in winding the rubber crawler about the sprocket, the distortion is concentrated on the rubber elastic body in the width direction of the region in which the coupling body is embedded, while the distortion is relatively small in the region in which the coupling body is embedded because the coupling body has the rigidity. The difference in the distortions is increased between the coupling body and the rubber elastic body in the width direction out of the coupling body, which concentrates the strain caused by the repeated tension and the compressive distortion on the rubber elastic body in the region.

Therefore, in order to prevent the concentration of the strain caused by the repeated compressive distortion, the recess B may be formed in the rubber elastic body in the region apart from the coupling body in the width direction of the rubber crawler. As a result, the degradation of the rubber can be prevented and the durability of the rubber crawler can be improved.

In FIG. 7 of Japanese Patent Laid-Open Publication No. 06-316281, the closed-loop openings are formed in the left and right wing portions, which are of the rubber embedding portion. While Japanese Patent Laid-Open Publication No. 06-316281 improves the adhesion between the core bar and the rubber which is of the base material of the rubber crawler, no technical motive that the tensile materials are coupled by utilizing the opening. In this way, the Japanese Patent Laid-Open Publication No. 06-316281 is completely different from the invention in the structure.

EXAMPLES

Figure 3:
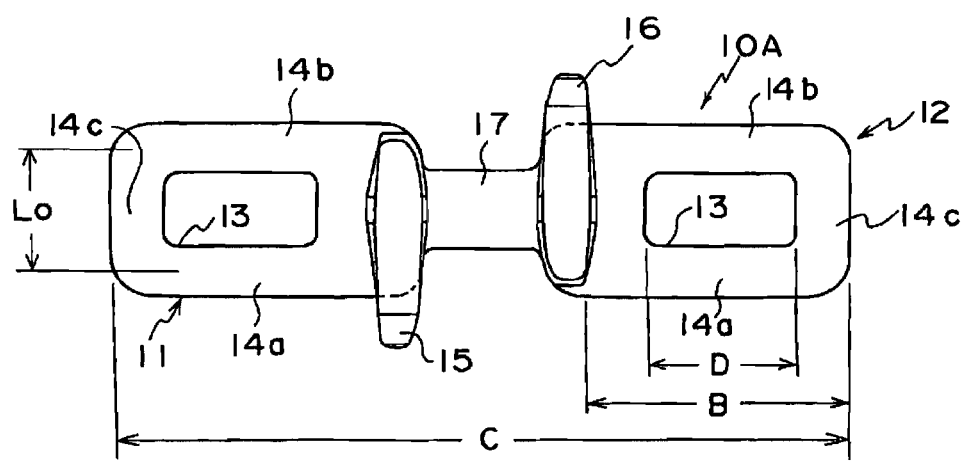
FIG. 3 is a plan view showing an inside of the core bar used for the rubber crawler of the invention.
Figure 4:
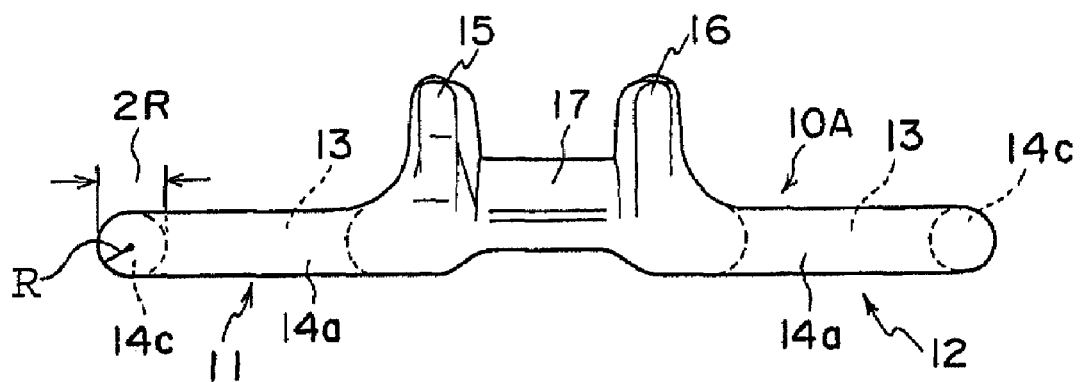
FIG. 4 is a front view showing the core bar of FIG. 3.
Figure 5:
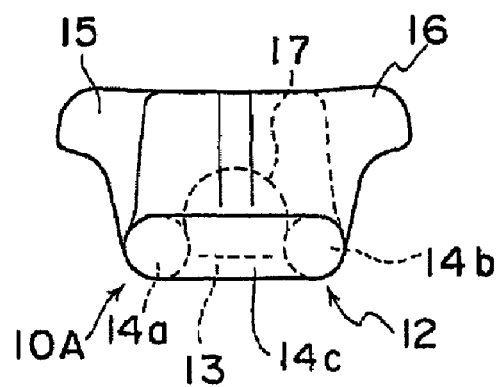
FIG. 5 is a lateral view showing the core bar of FIG. 4.

Referring to the accompanying drawings, the present invention will be described in detail below. FIG. 3 is a plan view showing an example of the core bar used for the rubber crawler of the invention when viewed from inside the rubber crawler, FIG. 4 is a front view showing the core bar. FIG. 5 is a lateral view showing the core bar.

In a core bar 10A, rectangular closed-loop openings 13 are formed in left and right wing portions 11 and 12, which are embedded in the rubber respectively. Edge portions 14a, 14b, and 14c are formed to make a rectangular closed loop around the closed-loop opening 13. Namely, in each closed-loop opening 13, front and rear portions in a lengthwise direction of the rubber crawler are preferably formed by the edge portions 14a and 14b with substantially circular shaped cross sections, and closed by the edge portion 14c. Each cross section of the edge portions 14a and 14b may have a substantially circular shape. In the present example, a pair of projections 15 and 16 is provided while sandwiching a central portion 17, which becomes an engagement portion with the sprocket. The projections 15 and 16 are arranged to have an appearance of being shifted from each other. Top surfaces of the projections 15 and 16 become a running path of the rotating wheel (not shown) and have a function of preventing the rotating wheel from running off.

In the core bar 10A, the cross sections of the edge portions 14a and 14b of the wing portions 11 and 12 are formed in the substantially circular shape having a radius R. A fitting portion of the coupling body is formed such that the edge portions 14a and 14b are fitted into the fitting portion. It is assumed that each lateral width of the edge portions 14a and 14b is set to D. Both lateral widths of the wing portion 11 and 12 respectively in which the closed-loop opening 13 is formed are set to B. A width of the core bar 10A is set to C. An interval between centers of the pair of edge portions 14a and 14b is set to $L_0$.

Figure 6:
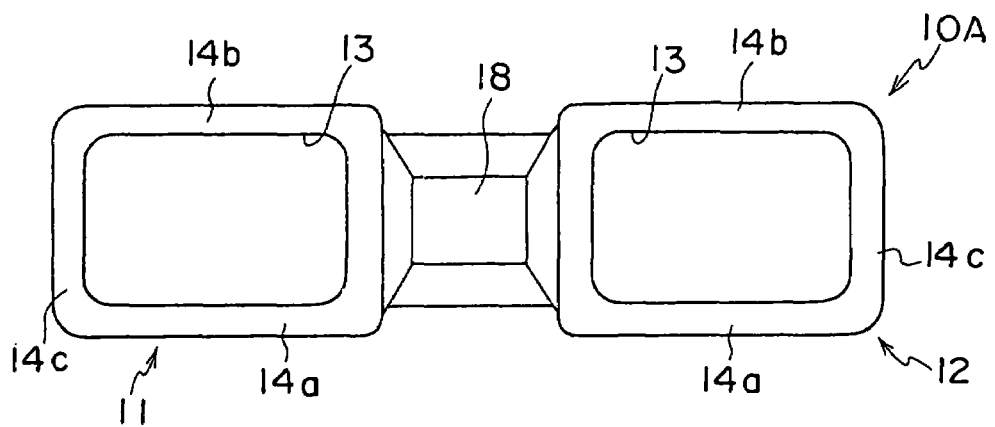
FIG. 6 is a plan view showing the inside of a modification of the core bar.

FIG. 6 is a plan view showing another example of the core bar 10A. Similarly to FIG. 3, the closed-loop openings 13 are formed in the left and right wing portions 11 and 12 respectively. The edge portions 14a and 14b are formed to make the rectangular closed loop around the closed-loop opening 13. The core bar 10A has a projection 18 at the central portion. The core bar 10A is used for a type, which may be called as inner drive type rubber crawler.

Figure 7A:
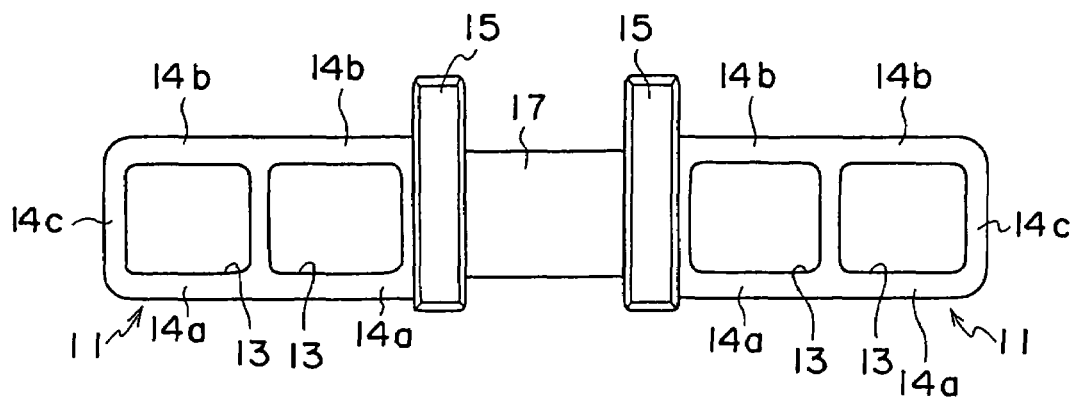
FIGS. 7A and 7B are plan views showing respectively the inside of another modification of the core bar.
Figure 7B:
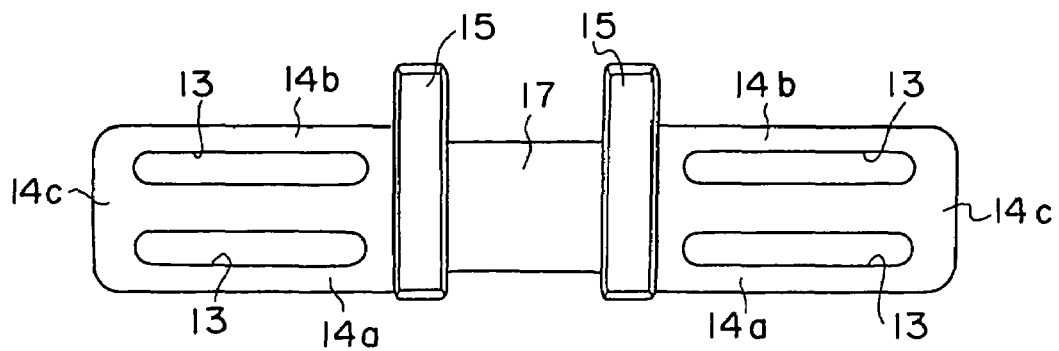

In the rectangular closed-loop openings 13 in which the edge portions 14a and 14b are formed in the left and right wing portions 11 and 12, not only one closed-loop opening 13 but also the plurality of closed-loop openings 13 may be formed as shown in FIGS. 7A and 7B.

Figure 8A:
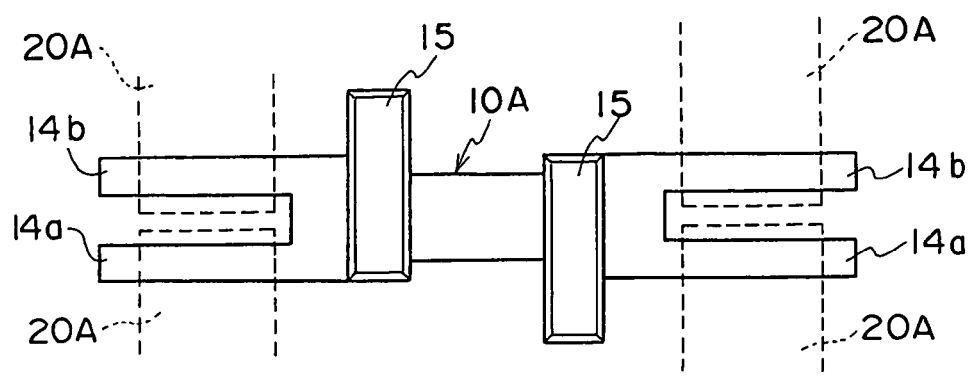
FIGS. 8A and 8B are plan views showing respectively the inside of still another modification of the core bar.
Figure 8B:
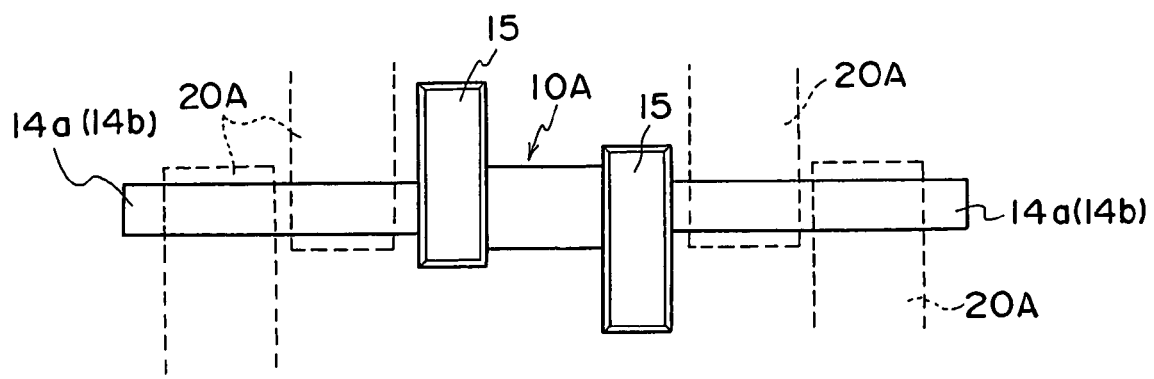

FIGS. 8A and 8B are plan views respectively showing still another example of the core bar 10A. In FIG. 8A, each of the left and right wing portions 11 and 12 is divided into two portions in the lengthwise direction of the rubber crawler. Each of the two portions appears to have a shape of a tuning fork, and is to have the edge portions 14a and 14b. Because the edge portions 14a and 14b are not closed, installation operation of the coupling body becomes easy. FIG. 8B shows still another example. In the left and right wing portions 11 and 12 of FIG. 8B, the edge portion 14a or 14b is formed in a rod-like body with a circular cross section.

Figure 9:
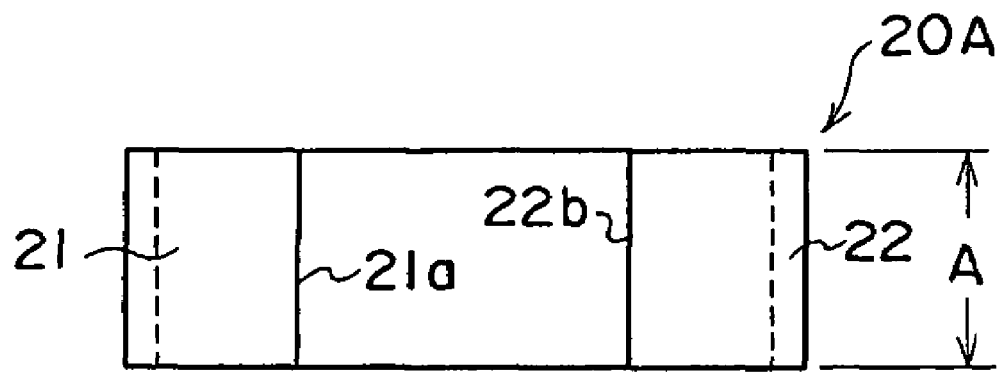
FIG. 9 is a plan view showing the inside of a coupling body (1).
Figure 10:
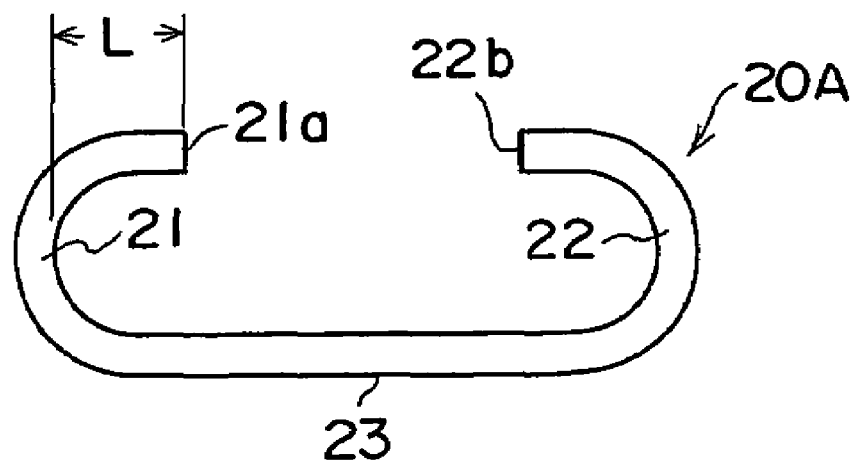
FIG. 10 is a lateral view of the coupling body (1).

FIG. 9 is a plan view showing an interior of an example of a belt-shaped coupling body 20A of the invention. FIG. 10 is a lateral view showing the coupling body 20A. Fitting portions 21 and 22 are formed at both ends of the coupling body 20A. The fitting portions 21 and 22 are formed on the same side with respect to the flat belt-shaped center portion 23 of the coupling body 20A. Fitting ends 21a and 22b face the inside to appear to have a C-shape from outward appearance. The fitting portions 21 and 22 are formed to have such a shape into which the edge portions 14a and 14b of the core bar 10A are fitted. In the present example, the width of the coupling body 20A is slightly smaller than the width of the closed-loop opening 13 in the wing portion of the core bar. The plurality of coupling bodies 20A may be lined up for use. Ends of the fitting ends 21a and 22b may be rounded in order to prevent the concentration of strain of the rubber. This is also applicable to the later-mentioned S-shaped coupling body.

In FIGS. 9 and 10, the reference letter L represents the length from the deepest part of the fitting portion of the coupling body to the end of the fitting portion. The reference letter A represents the width of the coupling body. The width L and the width A are prepared according to the above-described conditions in relation to the size of regions of the core bar.

Figure 11:
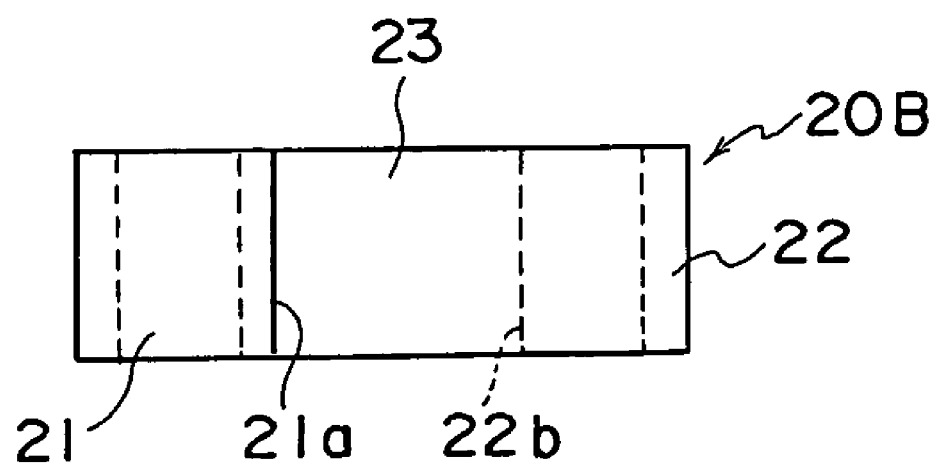
FIG. 11 is a plan view showing the inside of a coupling body (2).
Figure 12:
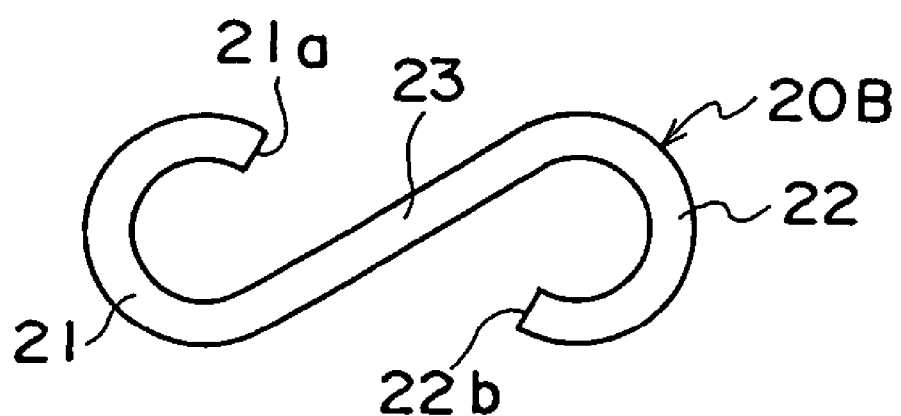
FIG. 12 is a lateral view of the coupling body (2).

FIG. 11 is a plan view showing the inside of an example of a belt-shaped coupling body 20B of the invention. FIG. 12 is a side view of the coupling body 20B. The fitting portions 21 and 22 are formed at both ends of the coupling body 20B. The fitting portions 21 and 22 are formed on the opposite sides with respect to the flat belt-shaped center portion 23 of the coupling body 20B. The fitting ends 21a and 22b are opened while facing to the inside of the coupling body 20B. The coupling body 20B is substantially formed in an S-shape when viewed from the side face. The fitting portions 21 and 22 are formed to have such a shape into which the edge portions 14a and 14b of the core bar 10B are fitted. In the present example, the width of the coupling body 20B is slightly smaller than the width of the closed-loop opening 13 in the wing portion of the core bar. The two-divided coupling bodies 20B may be used. In this case, the edge portions 14a and 14b may be fitted into the fitting portions 21 and 22 and the fitting portions 21 and 22 may be inversely arranged such that the central portions of the pair of coupling bodies 20B intersect with each other. In the case where the central portion 23 is intersected with each other and embedded in the rubber crawler, the strength remarkably improves as a counter-tension member.

Figure 13:
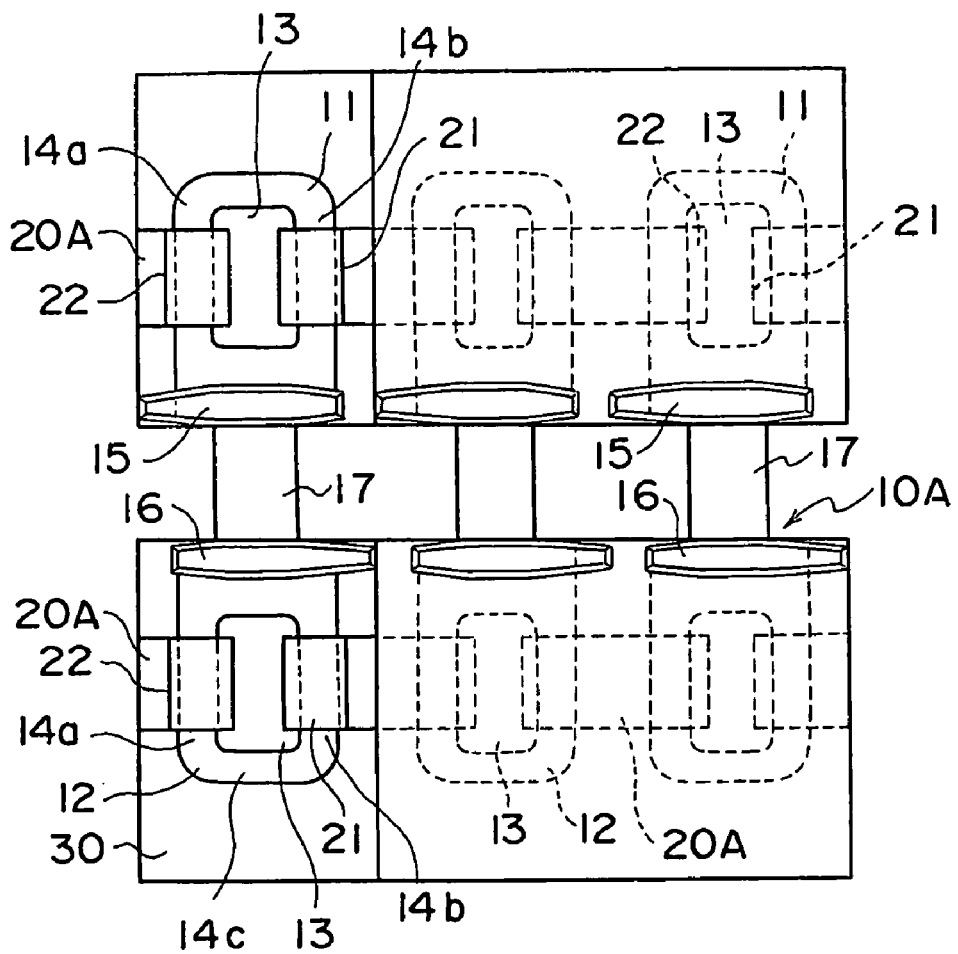
FIG. 13 is a plan view showing the inside of a coupled state of the core bar and the coupling body in rubber.
Figure 14:
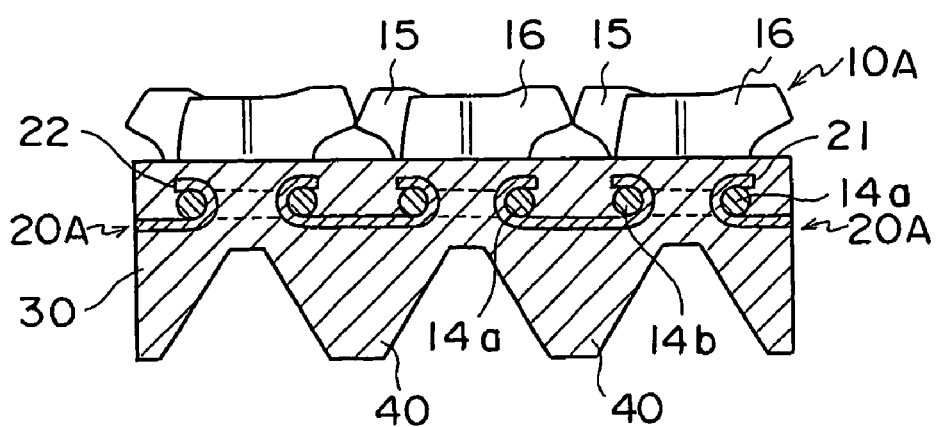
FIG. 14 is a cross sectional view showing the coupled state of FIG. 13.

FIG. 13 is a plan view showing the inside of a coupled state of the core bar 10A and the coupling body 20A embedded in a rubber 30. FIG. 14 is a cross sectional view showing the coupled state of FIG. 13. The fitting portions 21 and 22 formed at the both ends of the coupling body 20A are coupled with the edge portions 14a and 14b constituting the closed-loop opening 13 of the core bar 10. After this coupling, the edge portions 14a and 14b are included into the portions 21 and 22, and the edge portions 14a and 14b are included inside the fitting portions 21 and 22. Thus, the wing portions 11 and 12 of the core bars 20A embedded in the rubbers 30 are sequentially coupled, and the core bars 10A are coupled with each other to have the edge portions 14a and 14b inside the fitting portions 21 and 22. As a result, the coupling body 20A will not disengage easily. As described above, a smaller width of the coupling body 20A may be employed to have the edge portions 14a and 14b inside by coupling the plurality of coupling bodies.

Because the fitting between the edge portions 14a and 14b of the core bar 10A and the coupling body 20A can be performed only by slightly bringing one of the core bars 10A near to the other, work process is simple. Further, because the core bars 10A can be coupled with the coupling body 20A after the core bars 10A are set in the mold, working efficiency is extremely increased. In this case, in the rubber crawler, the fitting portions 21 and 22 of the coupling body 20A face the inner radius side. It is also possible that the fitting portions 21 and 22 of the coupling body 20A face the outer radius side. Sometimes a synthetic reinforcement material or a metal fiber material is embedded across the fitting ends 21a and 22b of the coupling body 20A. One or a plurality of sheets of reinforcement materials formed like in a reed screen or canvas may be used.

Figure 15:
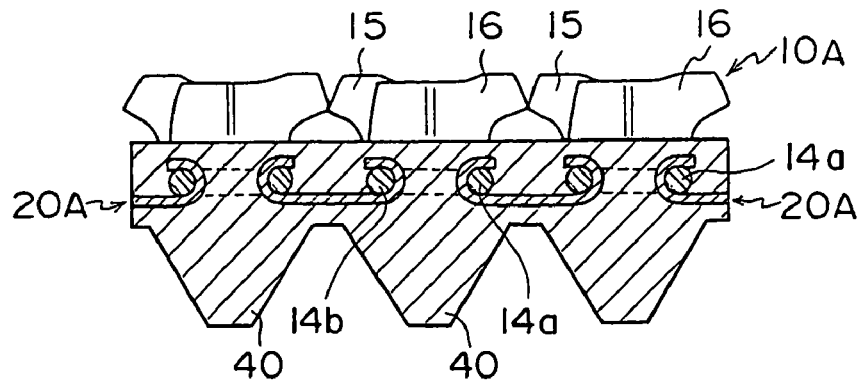
FIG. 15 is a cross sectional view showing the rubber crawler according to a second example of the invention.

As shown in FIG. 14, in the invention, lugs 40 are formed on the outer surface of the rubber crawler. The lug 40 is formed between the core bar 10A while the end portions of the fitting portions 21 and 22 of the coupling body 20A are covered with the base portion of the lug 40. A thickness of the rubber is increased by forming the lug 40 outside the fitting portion 21 and 22, in which the crack is most easily generated, and the rubber strain concentrated on the ends of the fitting portions 21 and 22 is absorbed by the thickness of the rubber. As a result, the generation of the crack is substantially eliminated. Sometimes the synthetic reinforcement material or the metal fiber material is embedded across the fitting ends 21a and 22b of the coupling body 20A. One or more than two sheets of reinforcement materials formed like in a reed screen or canvas may be used. FIG. 15 shows a second example of the invention in which the lug 40 is formed corresponding to the core bar 10A.

Figure 16:
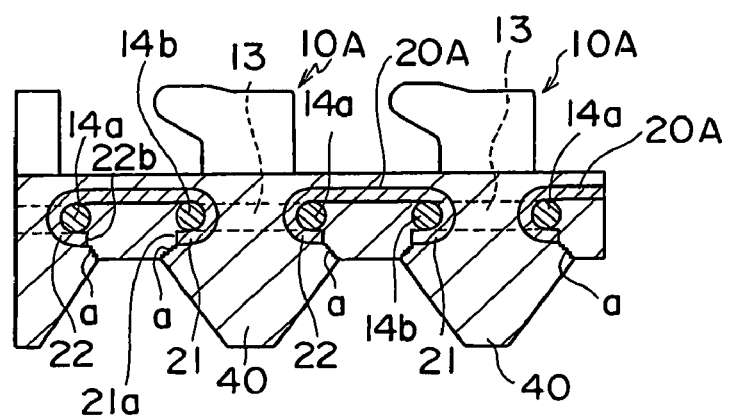
FIG. 16 is a cross sectional view showing the rubber crawler according to a third example of the invention.

FIG. 16 shows a third example of the invention in which the fitting portions 21 and 22 of the coupling body 20A face the outer radius side of the rubber crawler. The inside of the rubber crawler is compressed about the coupling body 20A and the outside of the rubber crawler is subjected to the tensile stress. In a conventional rubber crawler, the lug 40 is formed on the outer surface corresponding to the core bar 10A, and sometimes the crack a may be generated from a starting point of the fitting ends 21a and 22b of the coupling body 20A outside the rubber. The crack a may develop and affect the life of the rubber crawler. This phenomenon may similarly occur in the S-shaped coupling body.

Figure 17:
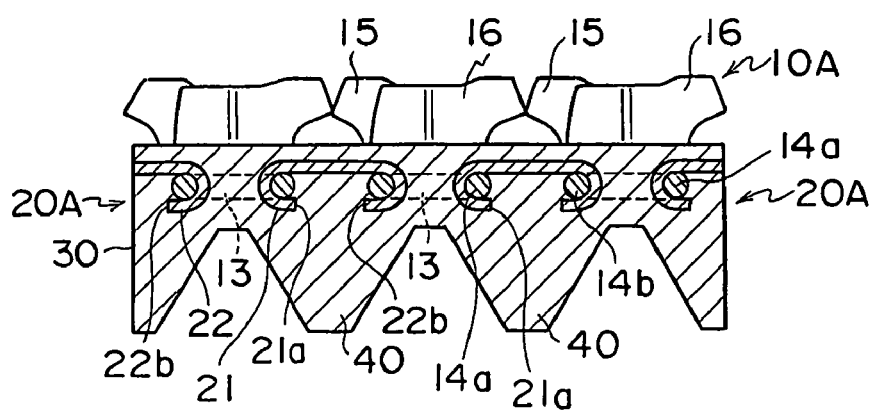
FIG. 17 is a cross sectional view showing the rubber crawler according to a fourth example of the invention.

FIG. 17 shows a fourth example of the invention which is to eliminate the occurrence of the crack a of the rubber. In the rubber crawler in which the fitting portions 21 and 22 of the coupling body 20A are arranged on the outside, the thickness of the rubber is increased on the outside corresponding to the fitting portions 21 and 22 of the coupling body 20A. The lug is formed at the position where the fitting portions 21 and 22 are to be covered. Namely, because the lug 40 is formed to cover the coupling body 20A in accordance with the fitting portions 21 and 22 where the crack a may be generated in the rubber, the thickness of the rubber corresponding to the fitting portions 21 and 22 is increased. Accordingly, the strain applied to the rubber is dispersed and absorbed, which largely decreases the generation of the crack. The base portion of the lug 40 is at least covered with respect to the fitting portions 21 and 22 of the coupling body 20A. Because one of the fitting portions of the S-shaped coupling body is in the same state as the C-shaped coupling body 20A, the lug is formed at the position where one of the fitting portions is to be covered.

Figure 18:
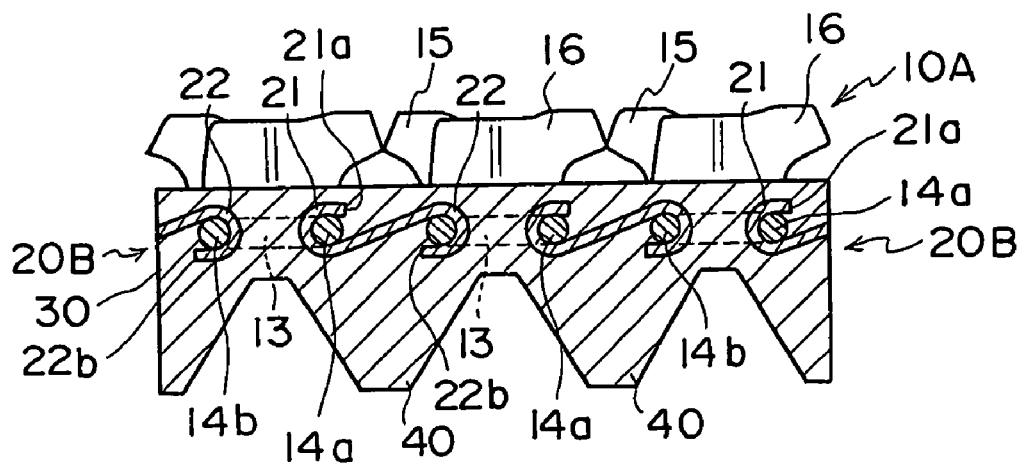
FIG. 18 is a cross sectional view showing the rubber crawler according to a fifth example of the invention.

FIG. 18 is a cross sectional view showing a fifth example of the rubber crawler of the invention when the second coupling body 20B is used. In the coupling body 20B, the fitting portions 21 and 22 are formed in the lengthwise direction of the rubber crawler are symmetric with respect to the central portion of the coupling body 20B. The lug 40 is formed on the outer surface of the rubber crawler to cover the coupling body 20B. As described regarding the C-shaped coupling body, the invention is not limited to the fourth example. The lug 40 may be formed between the coupling bodies 20B, i.e. the lug 40 is formed to cover the wing portions of the core body.

Figure 19:
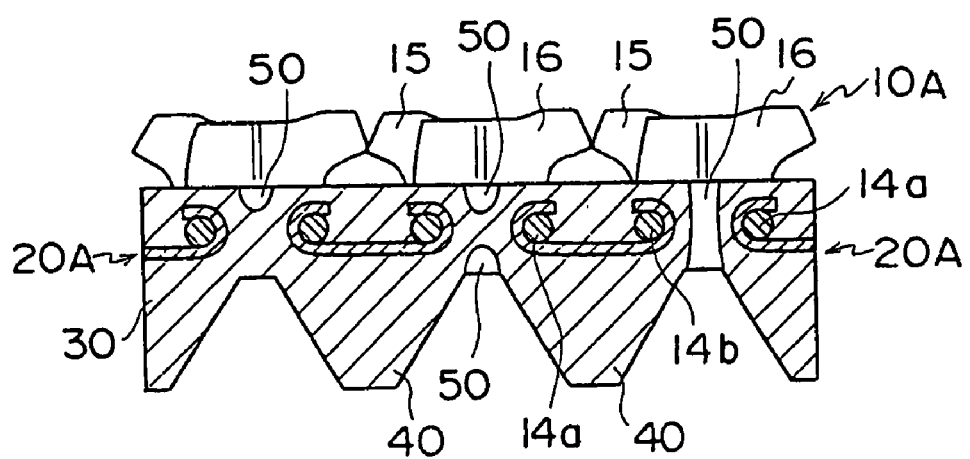
FIG. 19 is a cross sectional view showing the rubber crawler according to a sixth example of the invention.

FIG. 19 is a cross sectional view showing a sixth example about a modification of the rubber crawler of the invention. When the rubber crawler is wound about the sprocket or the idler, or in order to follow a rough road surface, the fitting portions 21 and 22 of the coupling body 20A are rotated about the edge portions 14a and 14b. In this case, the rubber in the region where the rubber is sandwiched between the fitting portions 21 and 22 of the adjacent coupling bodies 20A is subjected to a large strain.

In order to deal with this condition, a recess (A) 50 is prepared in the region subject to such a strain in this example. The recess (A) 50 is formed inside or outside the rubber crawler and usually the recess (A) 50 is arranged in a line along the width direction of the rubber crawler. In some cases, the recess 50 may be formed to go through the rubber crawler.

Even if the rotating action is applied to a portion between the fitting portions 21 and 22 of the coupling body 20A and the edge portions 14a and 14b, a large shear strain will not occur in the specific region. In addition, the winding resistance of the rubber crawler is lowered. In the C-shaped coupling body 20A, forming an unillustrated recess in the rubber between the fitting portions 21 and 22 is effective for the shear strain. Sometimes the synthetic reinforcement material or the metal fiber material may be embedded across the fitting ends 21a and 22b of the coupling body 20A. One or more sheets of reinforcement materials formed in the reed screen or the canvas may be used.

As described above, when the edge portions 14a and 14b are fitted into the plurality of C-shaped coupling bodies 20A, or when the edge portions 14a and 14b are fitted into the C-shaped coupling body while the coupling body is arranged inside out, the same effect is obtained by forming the recess (A) 50 in the rubber in the region where the shear strain is generated. Even if the lug 40 is formed at the position where the lug 40 faces not the coupling body 20A but the core bar 10A, the same effect is also obtained.

Figure 20:
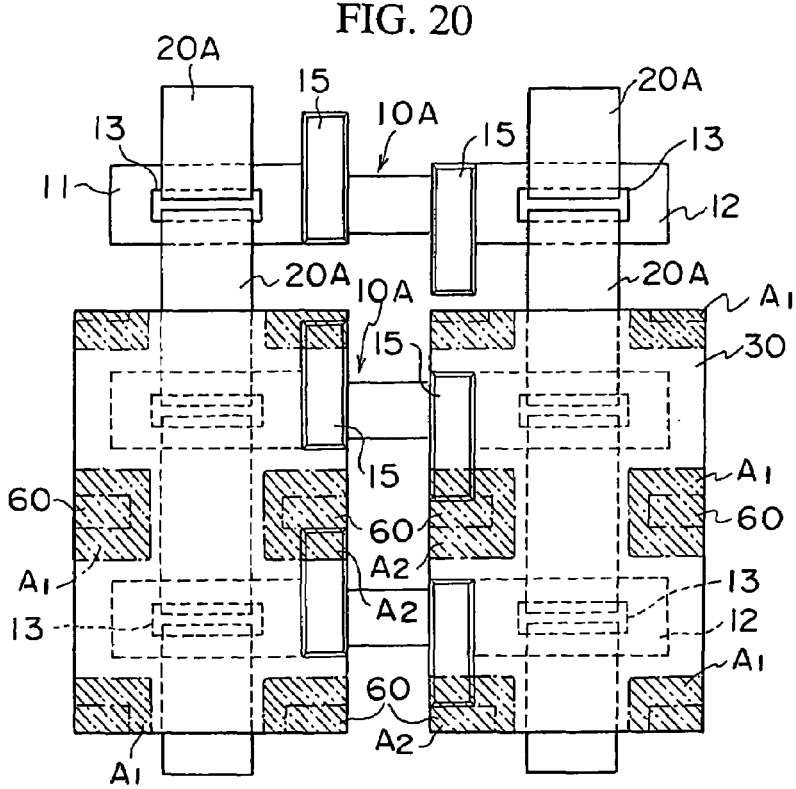
FIG. 20 is a plan view showing the inside of the rubber crawler according to a seventh example of the invention.
Figure 21:
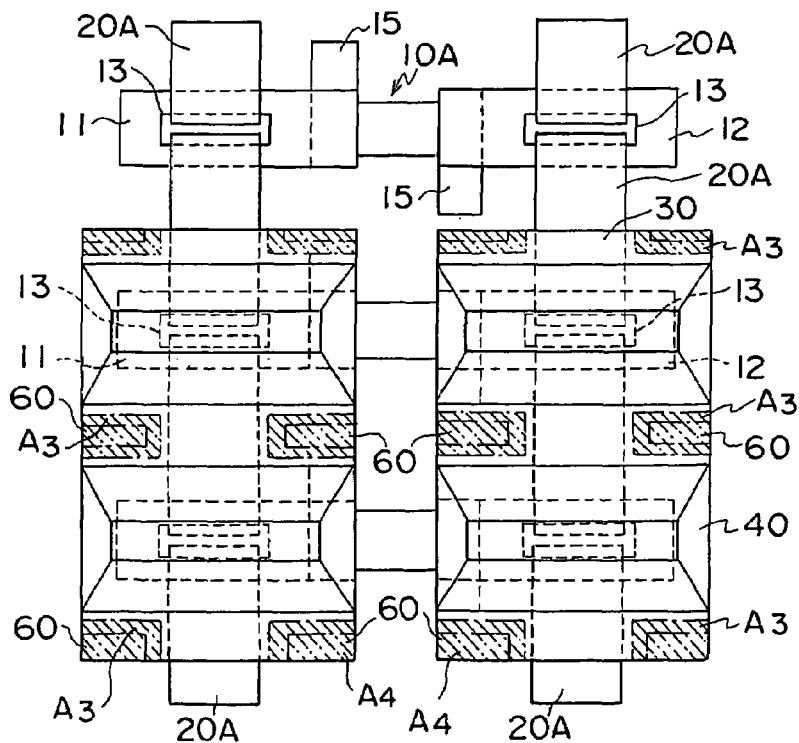
FIG. 21 is a plan view showing an outside of the rubber crawler of FIG. 20.

FIG. 20 is a plan view showing the inner radius side of a seventh example in which the rubber crawler of the invention is further improved, and FIG. 21 is a plan view showing the outer radius side of the rubber crawler shown in FIG. 20. The reference numeral 30 represents a rubber elastic body. The pair of projections 15 and 15 projecting from the inner radius surface of the rubber elastic body 30 is provided on the core bar 10A, and the wing portions 11 and 12 are provided on the left and right sides of the projections 15 and 15. The wing portions 11 and 12 are embedded in the rubber elastic body 30. The core bar 10A equivalent to the core bar shown in FIGS. 3 to 5 is used. The components are coupled with the C-shaped coupling body 20A.

When the rubber crawler is wound about the idler or the sprocket, the distortion is concentrated on the rubber portion in the width direction, in which the coupling body 20A is not embedded, while the coupling body 20A which is of a rigid body never bends. The regions on which the strain is concentrated by the repeated distortion are an $A_1$ portion and an $A_2$ portion (shown by oblique lines) in the inner radius surface and an $A_3$ portion and an $A_4$ portion (shown by oblique lines) in the outer radius surface corresponding to the coupling body 20A of the rubber elastic body 30. Namely, the region on which the strain is concentrated is the rubber portion located on left and right sides in the width direction of the coupling body 20A. Further, when the rubber crawler is wound about the sprocket or the like, the rubber crawler does not rotate smoothly or rotates badly, the rotational resistance also increases, and the durability of the rubber crawler is also largely affected.

In order to deal with this, in the rubber of the region on which the strain is concentrated, it is necessary to form the structure in which the repeated distortion will be as smooth as possible. The present example is a modification for this necessity. The thickness of the rubber elastic body in the regions of $A_1$ to $A_4$ is formed to lower the resistance against the repeated distortion. Specifically, a recess (B) 60 is formed in order to decrease the thickness of the rubber in the regions $A_1$ to $A_4$.

The recess (B) 60 may be provided on the outside of A, in the width direction of the coupling body 20a in the inner radius surface of the rubber elastic body 30. The recess (B) 60 may be provided in other regions. In some cases, The recesses (B) 60 may be formed in the above-described places.

INDUSTRIAL APPLICABILITY

The present invention has the configurations as described above. The tensile material (steel cord) body, which has been regarded indispensable, is omitted in the invention. In this way, the invention provides a rubber crawler, which can serve new applications.

What is claimed is:

1. A rubber crawler comprising:
   a plurality of core bars which are embedded at constant intervals in a lengthwise direction of the rubber crawler, wherein each core bar comprises left and right wing portions, each wing portion including a pair of edge portions; and
   a plurality of coupling bodies, each coupling body including an opening and two fitting portions, each fitting portion being provided at an end of the coupling body, and
   lugs formed in an outer surface of the rubber crawler and located at a position covering the coupling body;
   wherein the edge portions of adjacent core bars are coupled to each other by fitting the edge portions into the fitting portions of one of the coupling bodies, and the coupling body is a tensile material;
   wherein one of the fitting portions of the one of the coupling bodies and the fitting portion of an adjacent coupling body of the coupling bodies are respectively provided at the edge portions of one of the adjacent core bars, and the one of the coupling bodies and the adjacent coupling body are pivotably linked to the one of the adjacent core bars only at the fitting portions of the one of the coupling bodies and the adjacent coupling body;
   wherein each opening faces an outer surface of the rubber crawler, and the entire coupling body is embedded in the rubber crawler so as to be positioned within a region in a lengthwise direction of the rubber crawler where one of the lugs is formed.

2. The rubber crawler of claim 1, wherein the pair of edge portions is made by forming a closed-loop opening in the left and right wing portions of the core bar.

3. The rubber crawler of claim 1, wherein a cross section of the edge portion has a substantially circular shape.

4. The rubber crawler of claim 1, wherein the coupling body has a C-shape when viewed from a lateral face.

5. The rubber crawler of claim 4, wherein the coupling body is made of a metal material.

6. The rubber crawler of claim 1, wherein the coupling body is made of a plastic material.

7. The rubber crawler of claim 4, wherein the edge portion has a circular cross section whose radius is R, and $L \geq 1.5 R$ and $A/D \geq 0.7$ when a width of the edge portion is set to D, a length from a deepest portion of the fitting portion of the coupling portion to an end of the fitting portion is set to L, and a width of the coupling body is set to A.

8. The rubber crawler of claim 7, wherein $A/B \geq 0.3$ when a lateral width of the wing portion of the core bar is set to B.

9. The rubber crawler of claim 7, wherein $A/C \geq 0.1$ when a lateral width of the core bar is set to C.

10. The rubber crawler of claim 1, wherein the fitting portions are completely embedded within the rubber crawler.

11. The rubber crawler according to claim 1, wherein a position of each of the lugs is substantially aligned with a position of each of the coupling bodies with respect to the lengthwise direction of the rubber crawler.

* * * * *